United States Patent [19]

Hughes et al.

[11] 4,404,523

[45] Sep. 13, 1983

[54] READOUT CIRCUIT FOR LINEAR DISPLACEMENT TRANSDUCER

[75] Inventors: Michael G. Hughes, Sharon, Vt.; Radu R. Tenenbaum, Hanover, N.H.; Al Bugay, Boulder, Colo.

[73] Assignee: The United States of America as represented by the Secretary of the Interior, Washington, D.C.

[21] Appl. No.: 168,823

[22] Filed: Jul. 10, 1980

[51] Int. Cl.³ .............................................. G01B 7/14
[52] U.S. Cl. .................................................... 324/207
[58] Field of Search ................ 324/207, 208; 340/690; 73/597

[56] References Cited

U.S. PATENT DOCUMENTS 4,071,818 1/1978 Krisst ................................. 324/208
4,305,283 12/1981 Redding ............................. 324/208

OTHER PUBLICATIONS

Ivor Hawkes Associates, "Measurement of Mine Roof Movement", Jul. 1978, pp. 109–114.

Primary Examiner—Gerard R. Strecker
Assistant Examiner—Walter E. Snow
Attorney, Agent, or Firm—Thomas Zack; Donald A. Gardiner

[57] ABSTRACT

A readout circuit for determining the displacement of a magnet relative to a fixed reference point is disclosed. The relative displacement is determined by measuring the time interval required for a stress wave created in a magneto-strictive probe adjacent to the magnet to travel to the reference point. The readout circuit includes a counter means for counting at a predetermined rate. In order to determine the displacement of the magnet using the readout circuit, a pulse signal is generated in the probe causing a stress wave to be created in the probe at the location of the magnet. The counter means of the circuit is then activated in timed relation to the generation of the pulse signal. A means for detecting the arrival of the stress wave at the reference point and for stopping the counter means when the wave is detected is also provided in the readout circuit. By measuring the travel time for the stress wave with the readout circuit, the displacement of the magnet is determined. The fixed reference point may be either the end of the probe, or a reference magnet adjacent to the probe.

8 Claims, 3 Drawing Figures 4,404,523

READOUT CIRCUIT FOR LINEAR DISPLACEMENT TRANSDUCER

FIELD OF THE INVENTION

This invention relates to a readout circuit for a linear displacement transducer, and more particularly to a readout circuit for measuring the time interval required for a stress wave created in a magneto-strictive probe to travel to a fixed reference point.

BACKGROUND OF THE INVENTION

When rock or mineral is excavated in underground mining operations, the static stress distribution around the excavation is redistributed. The vertical stresses on the roof and floor and the lateral stresses on the side (pillar) walls or ribs are removed, and to maintain equilibrium, the rock subsides, the floor heaves, and the side walls bulge out. These initial movements are usually very small and take place during the actual excavation operations. Consequently, they are rarely, if ever, measured. Subsequent movements of the excavation are brought about by a combination of two factors: workings in adjacent strata, which causes a further redistribution of the stresses; and creep and fracture of the rock in the roof, floor, and sides (pillars) of the excavation.

The stability of an excavation is usually measured in terms of the magnitude and nature of the movements that take place around it. While there can often be significant movement in the floor and side walls, from the point of view of safety the roof bed movement is usually the one of most concern. Roof falls are almost invariably preceded by measurable displacements in the vertical direction. The fall itself merely represents the final stage in which the falling material is physically separated from its surroundings. It has been established by tests over many years that the magnitude and rate of change of roof bed movements can provide a reliable indication of roof stability.

There are two basic measurements made on mine roofs to determine stability: roof to floor movements (convergence) and the opening of fracture and bedding planes within the roof strata (roof bed separation). The instruments and techniques currently in use in the mining industry to measure roof movements have included extensometers set in bore holes. Measurements with the extensometers have been made on site using micrometers or simple scales. However, where detailed investigations require a continuous monitoring, a remote reading location away from mining traffic is necessary. Where only day-to-day measurements are needed, it is important to keep both equipment and data interpretation as simple as possible.

It has been suggested that a linear distance measuring device such as disclosed in U.S. Pat. No. 3,898,555 to Tellerman could be used to measure roof movements in a mine. However, it was found that the readout circuit of the Tellerman patent was not suitable for use in a mine because it was tuned to each transducer, consumed a relatively large amount of power, and was not compatible with cabling over excessive distances. Other position indicating devices are disclosed in U.S. Pat. Nos. 4,028,619 to Edwards; No. 3,423,673 to Bailey et al; and No. 4,071,818 to Krisst. However, there has not been disclosed in the prior art a suitable readout circuitry for use in a mine. In order to be used in a mine, the readout circuitry must be portable. In addition, the readout circuit should be battery-operated and approved under current standards of the Mining Safety and Health Administration for devices used in methane air mixtures. The work which resulted in the invention disclosed and claimed herein was done under contract with the U.S. Bureau of Mines by Ivor Hawkes Associates, Lebanon, New Hampshire. The final contract report relating to this work was dated July 1978 and first made available to the public on Sept. 3, 1980.

SUMMARY OF THE INVENTION

In accordance with the present invention, a readout circuit is provided for determining the displacement of a magnet relative to a fixed reference point. The displacement is measured by determining the time interval required for a stress wave created in a magneto-strictive probe located adjacent to the magnet to travel to the reference point. The time interval is measured using a counter means which counts at a predetermined rate when activated. A means for generating a pulse signal in the probe is used to create a stress wave at the location of the magnet. The means for generating the pulse signal also activates the counter means in a timed relation to the generation of the pulse signal. When the stress wave arrives at the reference point, it is detected and the counter means is stopped.

In one embodiment, the reference point can be the end of the magneto-strictive probe. Using this embodiment, the generating of a pulse signal in the probe and the activating of the counter means occur simultaneously. In a second embodiment, the reference point is determined by a reference magnet which also creates a stress wave in the magneto-strictive probe upon the generation of the pulse signal. In this embodiment, the counter means is activated by the detection of the first stress wave from the reference magnet and stopped by the detection of the second stress wave from the magnet in question. Both of these embodiments can also be provided with a display to read the final count and with a suitable power supply means such as a bank of batteries.

Other features and advantages of the present invention are stated in or are apparent from the detailed description of presently preferred embodiments of the invention found hereinbelow.

DETAILED DESCRIPTION OF THE PREFERRED EMBODIMENTS

Figure 1:
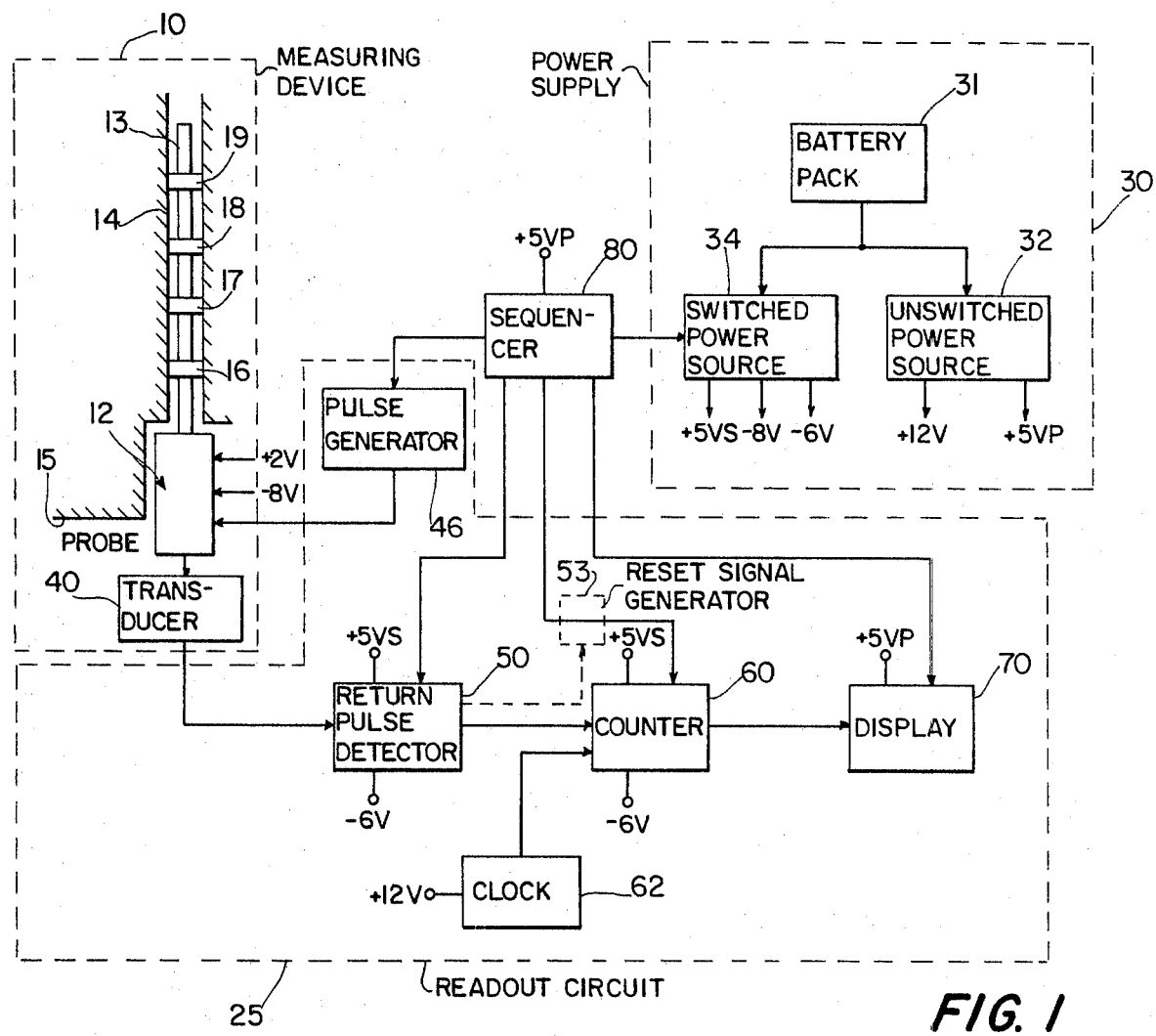
FIG. 1 is a schematic block diagram of the readout circuit of the present invention.

With reference now to the drawings in which like numerals represent like elements throughout the several views, a presently preferred embodiment of the present invention is depicted which comprises a roof movement measuring device, generally denoted 10, and a readout circuit, generally denoted 25.

Measuring device 10 advantageously comprises a magneto-strictive probe 12 and a transducer 40. Probe 12 advantageously is conventional and can conveniently consist of a ¼ inch diameter stainless steel tube or a ⅜ inch diameter plastic outer tube 13 enclosing a second tube (not shown) made from a magneto-strictive material such as a nickel-cadmium alloy. A TEMPO-MS probe manufactured by Temposonics Inc. has proven suitable in practice.

As will be appreciated by those of ordinary skill in the art, a magneto-strictive material is one which changes its volume when placed in a magnetic field. A stress wave is generated in the material when a local magnetic discontinuity is suddenly created. In order to measure the roof separation in a mine, a bore hole 14 is drilled upward from the roof 15. A plurality of magnets, such as the four magnets 16, 17, 18 and 19 shown, are anchored in the bore hole and disposed in a spaced relationship. While any shape of magnet will suffice, ring-shaped magnets through which probe 12 may be inserted are convenient. With the probe 12 disposed adjacent the magnets, a current pulse suddenly generated in the conductor running through the center of the probe creates a magnetic field which interacts with the permanent magnetic field of each magnet. Due to this interaction of the two magnetic fields, a stress wave is generated in the magneto-strictive material of the probe at the location of each ring magnet 16 to 19. Each stress wave travels to the end of probe 12 at a constant velocity. By measuring the time interval between the arrival of the stress waves, the displacement between individual magnets can be calculated.

In order to measure roof movement, a reference point must be established with respect to roof 15. Depending on whether relatively continuous monitoring of roof movement is to take place, or whether only occasional checks are to be made, the reference point can differ. Where a continuous check of roof movements is to be made, probe 12 is anchored to roof 15 and left in place. In this case, the end of probe 12 at the surface of roof 15 acts as the reference point. The time intervals measured are then the time periods between the pulse signal generated in the probe conductor and the arrival of the stress wave at the end of the probe. If only occasional checks are made of roof movement, then probe 12 is preferably removable from bore hole 14 so that other bore holes can be checked. In this case, since the end of the probe 12 cannot be used as a reference point because its position can vary with respect to the magnets upon each insertion, the magnet which is located nearest the surface of roof 15 (magnet 16 in FIG. 1) is mounted adjacent the roof surface and acts as the reference point. When magnet 16 is used as the reference point, the time intervals measured are the time periods between the arrival at the end of the probe of the stress wave from magnet 16 and the arrival of the stress waves from the other magnets.

Transducer 40 is connected to the head of probe 12. Transducer 40 advantageously is a conventional torsional transducer based on the Villari effect which creates electrical signals when excited by the stress waves created in probe 12.

Measuring device 10 and readout circuit 25 are powered by a power supply, generally denoted 30, which preferably comprises a battery pack 31 having 12 AA size nickel-cadmium batteries (not shown) connected in series to provide an eighteen volt voltage. The batteries are preferably connected in series with a conventional current limiter (not shown), which advantageously comprises three parallel-connected 12 ohm, 3-watt, wire-wound, limiting resistors (not shown). The batteries and current limiter preferably are sealed in a PVC container so that power supply 30 and readout circuit 25 comply with the Mining Enforcement and Safety Administration safety requirements for coal mine use. When fully charged, battery pack 31 has a useful life of 12 to 14 hours with the preferred embodiment of readout circuit 25 to be described hereinbelow continuously switched on.

Power supply 30 further comprises an unswitched power source 32 and a switched power source 34 powered by battery pack 31. Unswitched power source 32 advantageously comprises conventional regulators (not shown) to provide the necessary energizing voltages for circuit 25. With the preferred embodiment of circuit 25 described hereinbelow, two voltages of +12 volts and +5 volts are advantageous. Switched power source 34 advantageously comprises conventional transistor switching circuitry (not shown) which controllably connects battery pack 31 to conventional voltage sources (not shown) which supply actuating voltages for probe 12 and circuit 25. With the preferred embodiment of circuit 25 described hereinbelow, a conventional regulator and unregulated DC to DC converter (not shown) are employed to supply voltages of +5 volts and −8 volts, respectively. The output of the DC to DC converter preferably is fed through a 10 ohm resistor (not shown) to the magneto-strictive probe 12 and to a further conventional regulator which provides a −6 volt output which serves as the negative voltage used in the preferred embodiment of circuit 25.

As will be appreciated by those of ordinary skill in the art, readout circuit 25 and power supply 30 may be mounted on magneto-strictive probe 12 to provide a portable roof movement measuring device 10, or readout circuit 25 and power supply 30 may be located remotely from magneto-strictive probe 12 at a convenient location for reading.

A sequencer 80 advantageously is also provided for controlling the timing and operation of switched power source 34, measuring device 10 and readout circuit 25 such that the measuring sequence of readout circuit 25 is repeated with a predetermined frequency, which advantageously is approximately once per second, and such that switched power source 34 is enabled only during the time the measuring sequence is actually being performed by circuit 25.

Figure 2:
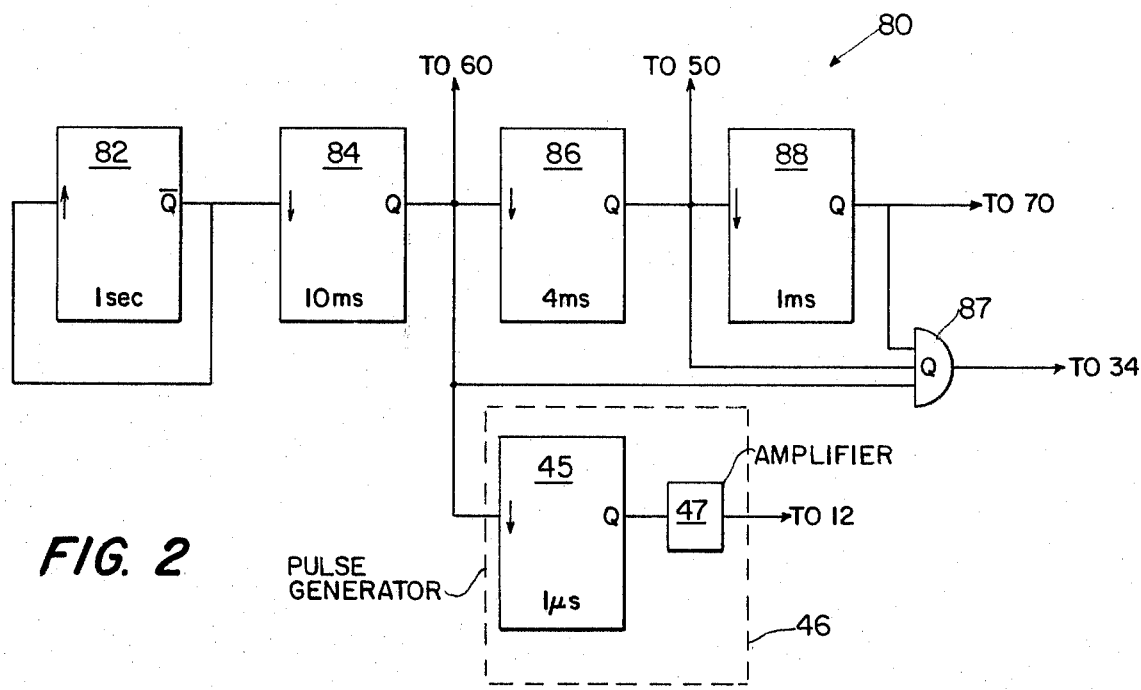
FIG. 2 is a schematic block diagram of the sequencer depicted in FIG. 1.

Sequencer 80 advantageously comprises a series of monostable multivibrators 82, 84, 86, and 88 connected to a NAND gate 87 as shown in FIG. 2. The time constant or period of multivibrator 82 is selected in accordance with the desired frequency of measurements. The period of multivibrator 84 is selected to provide a time delay to allow the switched voltage source voltage levels to stabilize and counter 60 to be reset. The period of multivibrator 86 is selected to correspond to the maximum transit time required for stress waves to reach transducer 40. The period of multivibrator 88 is selected so as to allow the contents of counter 60 to be loaded in display 70. As will be appreciated by those of ordinary skill in the art, successive output signals are produced by multivibrators 84, 86, and 88, and gate 87 will provide an enabling output to switched voltage source 34 during the entire time outputs are being produced by one of these multivibrators. With the preferred embodiments of probe 12, power supply 30, counter 60 and display 20 described herein, approximately 20 milliseconds (ms) are required for a measurement. Thus, with a measurement frequency of one measurement per second, periods of one second, 10 ms, 4 ms, and 1 ms have proven advantageous for miltivibrators 82, 84, 86 and 88, respectively.

Readout circuit 25 comprises a pulse generator 46 which is actuated by the output of sequencer miltivibrator 84 for generating current pulses in probe 12 so as to create the stress waves detected by transducer 40; a return pulse detector 50 which is enabled by the output of sequencer multivibrator 86 for detecting a predetermined one of the outputs of transducer 40; a counter 60 which is reset by the output of sequencer multivibrator 84 and optionally by a first output of detector 50, and is stopped by a second output of detector 50 for counting at a predetermined rate during the period stress waves are created and the predetermined output of transducer 40 is generated; and a display 70 which is controlled by the output of sequencer multivibrator 88 for displaying the contents of counter 60.

Pulse generator 46 may comprise any conventional pulse generator and preferably is one which generates a high frequency pulse. Advantageously, as shown in FIG. 2, generator 46 comprises a monostable multivibrator 45 which produces a one microsecond pulse and a transistor emitter-follower amplifier 47 which provides additional current drive for the pulse transmission. As will be appreciated by those of ordinary skill in the art, the current pulse generated by generator 46 is supplied to conventional embodiments of probe 12 by a conductor (not shown) which runs axially through the center of the probe tube.

Figure 3:
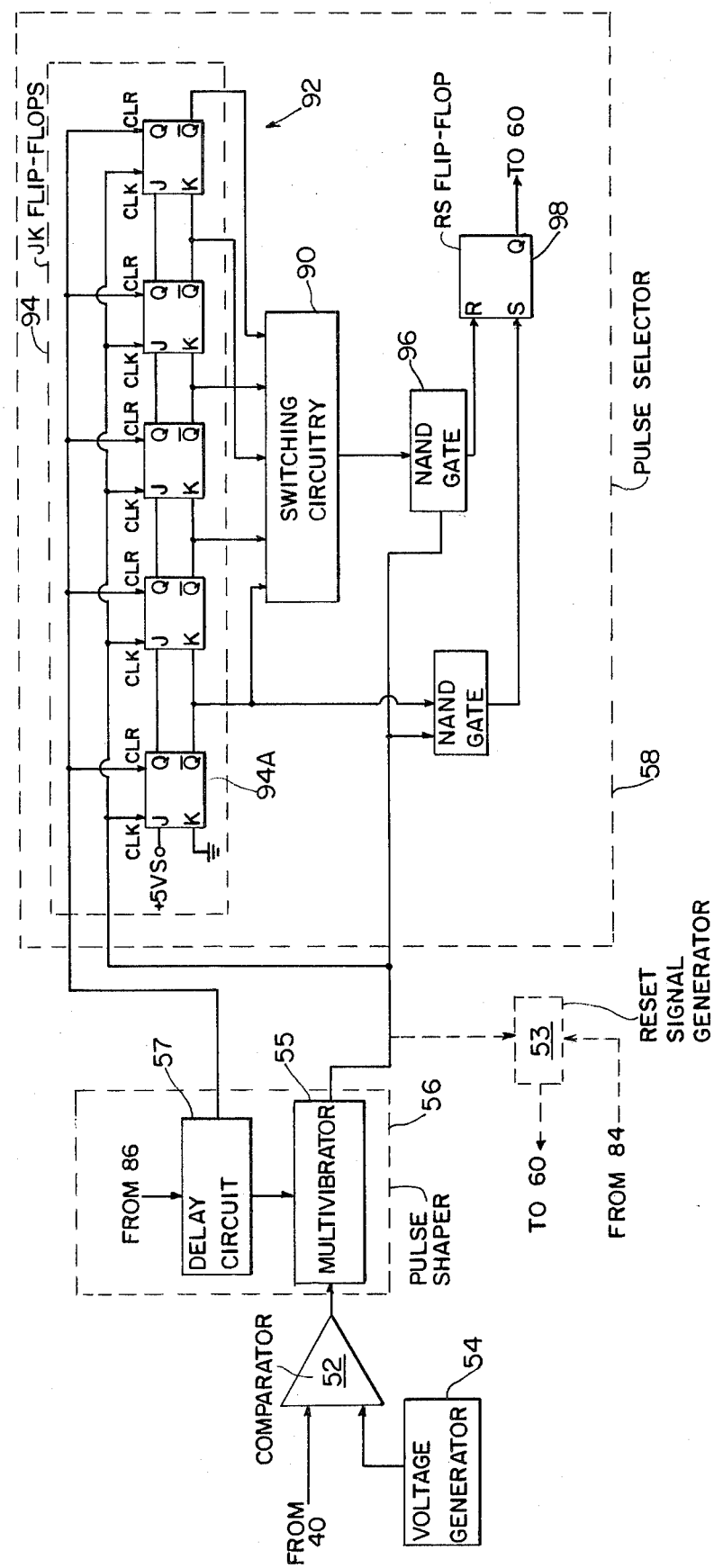
FIG. 3 is a schematic block diagram of the return pulse detector depicted in FIG. 1.

Referring specifically to FIG. 3, return pulse detector 50 preferably comprises a conventional comparator 52 which compares the outputs of transducer 40 with a predetermined threshold voltage supplied by a conventional generator 54, a conventional pulse shaper 56 for shaping the output of comparator 52, and a pulse selector 58 connected to the output of pulse shaper 56 for producing a counter control signal in accordance with a predetermined one of the outputs of transducer 40.

Since with a long embodiment of probe 12 the magnets located at the distal end of the probe produce a weaker transducer output than do magnets located near transducer 40, generator 54 preferably provides a ramp threshold voltage. A voltage controlled oscillator initially producing a 2 volt threshold voltage which decreases at a rate of 0.5 volts per millisecond has proven advantageous as generator 54.

Since the detected stress waves produce not a single pulse output from detector 40, but rather a short high frequency burst, pulse shaper 56 advantageously comprises a monostable multivibrator 55. Further, since the drive pulse generated by generator 45 creates a transient in the probe output, pulse shaper 56 preferably includes a conventional delay circuit 57 which inhibits the operation of multivibrator 55 for a predetermined period of time. Advantageously, the delay circuit 57 comprises a further monostable miltivibrator (not shown) which is triggered by the output of sequencer multivibrator 84 at the same time the drive pulse is generated.

Pulse selector 58 advantageously comprises a manually controlled switching circuitry 90 connected to conventional logic circuitry generally denoted 92, which determines which output from comparator 52 produces a control signal to inhibit the count of counter 60. A preferred embodiment of pulse selector 58 comprises a series of JK multivibrator flip-flops, collectively denoted 94, the $\overline{Q}$ outputs of which are selectively NAND connected via switching circuit 90 and a NAND gate 96 to the output of pulse shaper 56.

One flip-flop 94 is provided for each magnet associated with probe 12. The Q and $\overline{Q}$ outputs of the first through the penultimate flip-flop are connected as the J and K inputs, respectively, of the succeeding flip-flop. The J input of the first flip-flop, 94A, is connected to a "high" voltage which advantageously is the +5 volt voltage produced by the preferred embodiment of switch voltage source 34 described hereinabove, and the K input of flip-flop 94A is connected to a "low" voltage, which advantageously is a ground connection. The output of pulse shaper multivibrator 55 is connected to each of the flip-flops 54 as the clock (CLK) input, and the output of pulse shaper delay circuit 54 is connected to each of the flip-flops 54 as the clear (CLR) input.

A RS flip-flop 98, advantageously made up of NAND gates (not shown), is also provided. The $\overline{Q}$ output of JK flip-flop 94A is NAND connected by a NAND gate 99 with the output of pulse shaper multivibrator 55 and the output of gate 99 is connected as the SET input to RS flip-flop 98. The output of gate 96 is connected as the RESET input for RS flip-flop 98 and the $\overline{Q}$ output of RS flip-flop 98 is connected to counter 60 as the INHIBIT (ENABLE) input.

Counter 60 advantageously is of any conventional form. When probe 12 is permanently mounted in a bore hole, sequencer multivibrator 84 directly provides the reset signal, such that counter 60 begins counting immediately upon termination of the multivibrator 84 output and the simultaneous generation of the current pulse by generator 46. When probe 12 is removably mounted in a bore hole, the reset signal is provided by a conventional signal generator 53 which is controlled both by the output of multivibrator 84 and the output of miltivibrator 55 such that the reset signal continues after the multivibrator 55 produces its first output corresponding to the detection of the first stress wave by transducer 40. Preferably, counter 60 is driven by a conventional high speed clock 62 having high stability. A 110.12 MHz crystal oscillator has proven advantageous as clock 62. When the clock output is ECL compatible, the first counter stage of counter 60 preferably is a conventional high speed ECL BCD counter (not shown).

The second counter stage is a conventional TTL BCD counter (not shown) selected for its ability to count an 11 MHz signal, and the last four counter stages are low power CMOS BCD counters (not shown). To provide ECL compatibility, the output of pulse selector flip-flop 98 preferably is level shifted by a flip-flop (not shown). In addition, the counters advantageously are presettable UP/DOWN counters and clock 62 is flip-flop controlled to allow serialization of the data for datalogging purposes.

For low power consumption, display 70 preferably is a conventional six digit liquid crystal display having a BCD-compatible driver (not shown). Advantageously, display 70 is adapted so as to provide a continuous display which is updated once each measurement when the output of pulse selector flip-flop 98 causes the counter 60 to stop counting and the contents of the counter to be loaded into the storage buffers of the display driver.

In use, readout circuit 25 of the present invention functions in the following manner. As mentioned above, sequencer 80 controls the sequence of operations performed by readout circuit 25 and also controls the application of power to measuring device 10 and individual components of circuit 25 so as to minimize the power drain on, and thus maximize the life of, battery pack 31. At the start of a measurement cycle, monostable multivibrator 82 produces a pulse the trailing edge of which triggers sequencer multivibrator 84. The output of multivibrator 84 causes switched power source 34 to turn on, and resets counter 60. Since counter 60 cannot count in the presence of the reset signal, no count accumulates in counter 60 while the switched power source voltages are allowed to stabilize prior to generation of the probe excitation current pulse by generator 46. At the termination of the multivibrator 84 output, both sequencer multivibrator 86 and pulse generator 46 are triggered.

If probe 12 is permanently mounted in a bore hole, such that the end of the probe functions as the reference point, then counter 60 is enabled immediately by the termination of the sequencer multivibrator 84 output and commences counting simultaneously with the generation of the current pulse by generator 46. If probe 12 is removably mounted in a bore hole, such that one of the magnets functions as the reference point, then the reset signal provided by generator 53 is not terminated until the first stress wave has been detected by transducer 40 and pulse shaper 56 has produced a corresponding output.

The current pulse generator by generator 46 causes shock waves to be produced by probe 12. The output of multivibrator 86 causes detector delay circuit 57 to inhibit the output of pulse shaper multivibrator 55 for a predetermined time period and to clear the logic circuitry of pulse selector 58. Consequently, counter 60 is not prematurely inhibited by any transient signals generated by current pulse in probe 12.

The stress waves produced by probe 12 are sequentially detected by transducer 40. Pulse shaper 56 of return pulse detector 50 produces an output in correspondence to each output of transducer 40 and pulse selector 58 controls which of the pulse shaper 56 outputs produces an inhibit signal to stop counter 60 from further counting.

The termination of the sequencer multivibrator 86 output triggers sequencer multivibrator 88. The multivibrator 88 output causes the contents of counter 60 to be loaded into display 70 which displays a numerical value in correspondence therewith. The termination of the multivibrator 88 output turns off switched power source 34, which stays off until sequencer multivibrator 82 produces another pulse to start another measurement cycle. Display 70 continues to display the measurement just taken until the next measurement is completed.

Although the invention has been described in detail with respect to exemplary embodiments thereof, it will be understood by those of ordinary skill in the art that variations and modifications can be effected within the scope and spirit of the invention. In particular, it will be appreciated that multiple counters and displays may be provided, wherein each counter is controlled by a corresponding one of the outputs of pulse shaper 56 such that readings may be obtained in a single measurement of the relative displacement between the reference point and each of the magnets.

We claim:

1. A measurement circuit for a line displacement transducer, wherein the transducer comprises at least one magnet mounted to an object the displacement of which is to be measured, and a magneto-strictive probe disposed adjacent the at least one magnet, said measuring circuit comprising:

pulse generating means for exciting the probe such that a magnetic field is created in the probe which intersects with the magnetic field of the at least one magnet to create a corresponding at least one stress wave in the probe;

controllable counter means for counting at a predetermined rate, said counter means being responsive to a first control signal for commencing a counting and to a second control signal for stopping a counting;

means coupled to the probe and to said counter means for detecting said at least one stress wave and producing said second control signal;

control means coupled to said pulse generating means and to said counter means for controlling said pulse generating means and for producing said first control signal such that said counter begins counting in a predetermined time relationship to the generation of a pulse by said pulse generating means; and controllable power supply means for supplying power to said pulse generating means, said counting means, and said detecting means, and wherein said control means includes means for controlling said power supply such that power is supplied for a predetermined period of time during which a measurement is made.

2. The measuring circuit of claim 1 wherein said second control signal is a reset signal the presence of which prevents said counter means from counting.

3. The measuring circuit of claim 2 wherein said control means includes means for producing at least one timing signal which controls the operation of said power supply means and said pulse generating means, and from which said first control signal is derived.

4. The measuring circuit of claim 2 wherein the transducer comprises first and second spaced magnets mounted to the object and excitation of the probe creates first and second stress waves, and wherein said detecting means produces an output in response to each of said first and second stress waves, and said control means includes means responsive to said at least one timing signal and the output of said detecting means corresponding to detection of said first stress wave for producing said first control signal, and means for producing said second control signal in response to the output of said detecting means corresponding to detection of said second stress wave.

5. The measuring circuit of claim 4 wherein said control means further comprises means for producing said at least one timing signal at a predetermined repetition rate.

6. The measuring circuit of claim 4 further comprising display means connected to said counting means and responsive to said control means for selectively displaying the contents of said counting means, and wherein said timing signal producing means sequentially produces first, second, and third timing signals which together control said power supply means, said first timing signal also controlling the operation of said pulse generating means and being at least one of the signals from which said first control signal is derived, and said third timing signal also controlling the operation of said display means.

7. The measuring circuit of claim 6 wherein said timing signal producing means comprises first, second, and third monostable multivibrators connected in series for producing said first, second, and third timing signals, respectively.

8. The measuring circuit of claim 3 wherein the transducer comprises a plurality of spaced magnets mounted to the object and excitation of the probe creates a corresponding plurality of stress waves, and wherein said detecting means produces an output in response to each of said plurality of stress waves and further comprises means for producing said second control signal in response to a predetermined selected one of said plurality of stress waves.

* * * * *